W. S. HICKS.
COMBINED WATCH-CHAIN, BAR, AND BUTTON-HOOK.
No. 190,488. Patented May 8, 1877.
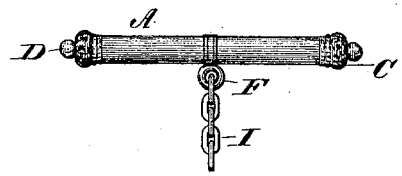
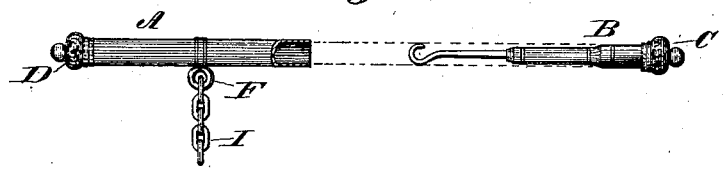
Witnesses:
Donn I. Twitchell.
Will H. Dodge.
Inventor:
W. S. Hicks.
by Dodge & Son,
Attys.

UNITED STATES PATENT OFFICE.

WILLIAM S. HICKS, OF NEW YORK, N. Y.

IMPROVEMENT IN COMBINED WATCH-CHAIN BAR AND BUTTON-HOOK.

Specification forming part of Letters Patent No. 190,488, dated May 8, 1877; application filed March 16, 1877.

*To all whom it may concern:*

Be it known that I, WILLIAM S. HICKS, of New York, in the county of New York and State of New York, have invented a Combined Chain-Bar and Button-Hook, of which the following is a specification:

My invention consists of a combined watch-chain bar and button-hook, the bar being made hollow, and the hook being so constructed as to permit it to be inserted within the hollow bar, and be withdrawn therefrom when needed for use, all as hereinafter more fully described.

Figure 1 is a side elevation of article complete; and Fig. 2 represents the parts detached, a portion of the case being shown in section.

Of late, button-hooks for use in buttoning gloves have come quite extensively into use, and are now made in various styles. Among others is the plan of making them on the principle of a pencil-case, to be carried loosely in the pocket, and also by attaching them as a pendant to watch-chains. When carried loosely in the pocket, the hook is liable to be lost or misplaced by a change of clothing, by its being left in the pocket of the removed garment, and thus is not at hand when needed. When hung to the chain as a pendant or charm, it is possible to use it to advantage; and, moreover, when made with an extension-case like that of a pencil, its cost is much increased. By my present invention these objections are obviated.

To construct a combined watch-chain bar and button-hook, I first make the bar A, which is tubular, having one end left open, the other end being closed, and, preferably, provided with an ornamental head, D. At the center an eye, F, is attached, in any convenient manner, for securing it to the watch-chain I, as shown in the drawings. I then make the hook B, and provide it with a handle, as shown in Fig. 2, it being made of such a size as to fit snugly within the tubular part or bar A, and if the part A is provided with a head, D, then the handle of the hook is to be provided with a corresponding head, C, as shown in Fig. 2.

When thus constructed the hook B is shoved into the open end of the bar A, as represented in Fig. 1, when the whole presents the appearance of a simple chain-bar.

When it is desired to use the hook, it can be readily withdrawn, and, after being used, as readily replaced.

By these means I produce a combined article, which, while serving as an ordinary chain-bar, also furnishes a button-hook of cheap construction, that is always in a position where it is readily accessible when needed, and not liable to be lost or mislaid, and in no way interferes with the use or appearance of the bar.

It is obvious that the bar may be made of any style desired, and be either plain or ornamental.

Having thus described my invention, what I claim is—

A combined watch-chain bar and button-hook, constructed substantially as described.

WILLIAM S. HICKS.

Witnesses:
  W. H. SEMBLER,
  EDWARD D. HICKS.